United States Patent
Suzuki et al.

(10) Patent No.: US 7,834,133 B2
(45) Date of Patent: Nov. 16, 2010

(54) PRODUCTION PROCESS OF POLY(ARYLENE SULFIDE)

(75) Inventors: Koichi Suzuki, Fukushima (JP); Hiroyuki Sato, Fukushima (JP); Nobuo Sato, Fukushima (JP); Hirohito Kawama, Tokyo (JP)

(73) Assignee: Kureha Corporation, Tokyo (JP)

( * ) Notice: Subject to any disclaimer, the term of this patent is extended or adjusted under 35 U.S.C. 154(b) by 243 days.

(21) Appl. No.: 11/666,346

(22) PCT Filed: Oct. 26, 2005

(86) PCT No.: PCT/JP2005/020053

§ 371 (c)(1), (2), (4) Date: Apr. 26, 2007

(87) PCT Pub. No.: WO2006/046748

PCT Pub. Date: May 4, 2006

(65) Prior Publication Data

US 2007/0265425 A1 Nov. 15, 2007

(30) Foreign Application Priority Data

Oct. 29, 2004 (JP) ............................. 2004-317025

(51) Int. Cl.
*C08G 75/14* (2006.01)
(52) U.S. Cl. ...................... 528/388; 528/373
(58) Field of Classification Search .................. 523/373
See application file for complete search history.

(56) References Cited

U.S. PATENT DOCUMENTS 4,786,711 A    11/1988  Senatore et al.
5,840,830 A *  11/1998  Miyahara et al. ............ 528/388
2006/0074219 A1  4/2006  Kawama et al.

FOREIGN PATENT DOCUMENTS

| EP | 0 240 016 A2 | 4/1987 |
| EP | 0 240 016 A3 | 4/1987 |
| EP | 1 577 336 A1 | 12/2003 |
| EP | 1577336 A1 * | 9/2005 |
| JP | 6-51792 | 1/1988 |
| JP | 02-302436 | 5/1989 |
| JP | 05-271414 | 3/1992 |
| JP | 2001-181394 | 12/1999 |
| JP | 2001-040090 | 1/2000 |
| JP | 2001181394 A * | 7/2001 |
| JP | 2004-244619 | 12/2003 |
| WO | WO 2004/060972 A1 | 7/2004 |
| WO | WO 2004060972 A1 * | 7/2004 |

OTHER PUBLICATIONS

Extended European search report for Application/Patent Nos. 05800046.4—2102/1813638, PCT/JP2005020053, dated Nov. 17, 2008, in English.

* cited by examiner

*Primary Examiner*—Randy Gulakowski
*Assistant Examiner*—Shane Fang
(74) *Attorney, Agent, or Firm*—Reed Smith LLP

(57) ABSTRACT

A process for producing a poly(arylene sulfide) including a charging step 1 of preparing a charging mixture containing an organic amide solvent, a sulfur source, an alkali metal hydroxide, water and a dihalo-aromatic compound and having a pH of at least 12.5; a first-stage polymerization step 2 of heating the mixture to initiate a polymerization reaction, thereby forming a prepolymer that a conversion of the dihaloaromatic compound is at least 50%; and a second-stage polymerization step 3 of adding a phase separation agent into the reaction system and adding an alkali metal hydroxide in an amount corresponding to 1 to 10 mol% per mol of the charged sulfur source at a time or in portions, thereby continuing the polymerization reaction.

21 Claims, No Drawings

PRODUCTION PROCESS OF POLY(ARYLENE SULFIDE)

TECHNICAL FIELD

The present invention relates to a production process of a poly(arylene sulfide) by subjecting a sulfur source and a dihalo-aromatic compound to a polymerization reaction in an organic amide solvent. More particularly, the present invention relates to a production process of a poly(arylene sulfide), by which a poly(arylene sulfide) excellent in the reactivity with a silane coupling agent such as γ-aminopropyltriethoxysilane can be stably and efficiently produced.

In the present invention, "a charged sulfur source" in a charging step may be referred to as "an available sulfur source" for distinguishing it from a sulfur source charged in a dehydration step. The reason for it is that the amount of the sulfur source charged into a reaction vessel in the dehydration step varies in the dehydration step. The charged sulfur source is consumed by a reaction with a dihalo-aromatic compound in a polymerization step. However, the molar amount of "the charged sulfur source" is based on a molar amount in the charging step.

BACKGROUND ART

Poly(arylene sulfides) (hereinafter abbreviated as "PASs") represented by poly(phenylene sulfide) (hereinafter abbreviated as "PPS") are engineering plastics excellent in heat resistance, chemical resistance, flame retardancy, mechanical properties, electrical properties, dimensional stability and the like. The PASs are commonly used in a wide variety of fields such as electrical and electronic equipments and automotive equipments because they can be molded or formed into various kinds of molded or formed products, films, sheets, fibers, etc. by general melt processing processes such as extrusion, injection molding and compression molding.

As a typical production process of a PAS, is known a process in which a sulfur source is reacted with a dihalo-aromatic compound in an organic amide solvent such as N-methyl-2-pyrrolidone (hereinafter may be abbreviated as "NMP"). However, the PAS obtained by the conventional production process has such defects that it is insufficient in toughness such as flexural strength and flexural elongation and flash is easy to occur upon injection molding. In order to overcome these defects, a method of reacting the PAS with a silane coupling agent has been proposed. However, the PAS obtained by the conventional production process has been generally insufficient in reactivity with the silane coupling agent, so that it is difficult to achieve satisfactory results.

On the other hand, there have been known processes, in which an alkali metal hydrosulfide or a mixture of an alkali metal hydrosulfide and an alkali metal sulfide is used as a sulfur source in place of the alkali metal sulfide, and the sulfur source is subjected to a polymerization reaction with a dihalo-aromatic compound in the presence of an alkali metal hydroxide (for example, Japanese Patent Application Laid-Open No. 2-302436, Japanese Patent Application Laid-Open No. 5-271414 and Japanese Patent Publication No. 6-51792). According to these processes, however, it is difficult to set conditions for stably performing the polymerization reaction. In addition, it is difficult to inhibit side reactions, since a great amount of the alkali metal hydroxide is used in these production processes. Further, it is difficult to obtain a PAS improved in the reactivity with the silane coupling agent.

As a process for producing a PAS improved in the reactivity with the silane coupling agent, there has heretofore been proposed a production process of a poly(arylene sulfide) by using, as a sulfur source, an alkali metal sulfide (a1) or using an alkali metal hydrosulfide (a2) and an alkali metal hydroxide (a3) in a proportion of at most 1 in terms of a molar ratio of (a3)/(a2), which comprises Step I of mixing this sulfur source and an alicyclic amide compound (for example, NMP) into a mixed solution; Step II of conducting polymerization while adding dropwise a polyhalo-aromatic compound to the mixed solution; and then Step III of adding an alkali metal hydroxide into the system on and after the time the amount of the polyhalo-aromatic compound consumed amounts to at least 50%, thereby conducting a reaction (Japanese Patent Application Laid-Open No. 2001-181394).

According to the process disclosed in Japanese Patent Application Laid-Open No. 2001-181394, a PAS, which has many reaction-active sites and good affinity for the silane coupling agent, can be obtained. However, side reactions are easy to occur, and it is difficult to stably perform the polymerization reaction. In particular, it is difficult to obtain a PAS having a sufficiently high melt viscosity, since a process of only raising a polymerization temperature to continue the polymerization reaction is adopted though the alkali metal hydroxide is added in Step III. The melt viscosity of the PAS is used as an index to its molecular weight or polymerization degree, and a high melt viscosity is desired in order to provide a PAS excellent in toughness. Furthermore, a long-time polymerization reaction is necessary for providing a PAS having a desired melt viscosity according to the process disclosed in Japanese Patent Application Laid-Open No. 2001-181394.

There has been proposed a production process of a poly(arylene sulfide) by subjecting a sulfur source including an alkali metal hydrosulfide and a dihalo-aromatic compound to a polymerization reaction in an organic amide solvent and adding an alkali metal hydroxide into the mixture for polymerization reaction continuously or in portions to control the pH of the mixture for polymerization reaction within a range of from 7 to 12.5 from the beginning to the end of the polymerization reaction (Japanese Patent Application Laid-Open No. 2004-244619). According to this process, a PAS having a high purity and a high melt viscosity can be stably provided while inhibiting side reactions and decomposition reactions. However, the PAS obtained by this process is insufficient in the reactivity with the silane coupling agent.

There has been proposed a process for producing a poly(arylene sulfide) by polymerizing a sulfur source and a dihalo-aromatic compound in an organic amide solvent, which comprises (1) a dehydration step of heating and reacting a mixture containing the organic amide solvent, an alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system; (2) a charging step of adding an alkali metal hydroxide and water to the mixture remaining in the system after the dehydration step, as needed, in such a manner that the alkali metal hydroxide and water are present in proportions of 1.00 to 1.09 mol and 0.5 to 2.0 mol, respectively, per mol of a sulfur source (hereinafter referred to as "charged sulfur source") including the alkali metal hydrosulfide; (3) a first-stage polymerization step of adding the dihalo-aromatic compound to the mixture to subject the sulfur source and the dihalo-aromatic compound to a polymerization reaction at a temperature of 170 to 270° C., thereby forming a prepolymer that a conversion of the dihalo-aromatic compound is 50 to 98%, and (4) a second-stage polymerization step of controlling the amount of water in the reaction system after the first-stage polymerization step so as to bring about a state that water is present in a proportion of 2.0 to 10 mol per mol of the charged sulfur source, and heating the reaction system to 245 to 290° C., thereby continuing the polymerization reaction (International Publication No. 2004/060972 Pamphlet).

According to the process disclosed in International Publication No. 2004/060972 Pamphlet, a PAS having a high melt viscosity and good reactivity with the silane coupling agent can be provided. Examples 1 to 3 of this document show that PASs having a melt viscosity of 110 to 145 Pa·s as measured at a temperature of 310° C. and a shear rate of 1216 sec$^{-1}$ were obtained.

In International Publication No. 2004/060972 Pamphlet, "reactivity with AS" is adopted as an index to the reactivity with the silane coupling agent. Here, AS means γ-aminopropyltriethoxysilane (abbreviated as "aminosilane"). The reactivity with AS is represented by a ratio (MV2/MV1) of a melt viscosity (MV2) of the PAS as measured at a temperature of 310° C. and a shear rate of 1216 sec$^{-1}$ after the PAS is reacted with γ-aminopropyltriethoxysilane (AS) to a melt viscosity (MV1) before the reaction. A higher ratio indicates that the PAS has better reactivity with the silane coupling agent. In this document, it is shown that the ratio (MV2/MV1) of the PASs obtained in Examples 1 to 3 is 2.2 to 2.5.

However, as to the process disclosed in International Publication No. 2004/060972 Pamphlet, there has been a room for improvement in sufficiently stable and efficient production of a PAS having a high melt viscosity and high reactivity with the silane coupling agent, since a process of charging the whole of a necessary amount of the alkali metal hydroxide in the charging step is adopted.

DISCLOSURE OF THE INVENTION

It is an object of the present invention to provide, in a production process of a poly(arylene sulfide) by polymerizing a sulfur source and a dihalo-aromatic compound in an organic amide solvent, a novel production process of a poly(arylene sulfide), by which a polymerization reaction can be conducted while inhibiting side reactions and decomposition reactions, and a poly(arylene sulfide) having sufficiently high reactivity with a silane coupling agent can be stably and efficiently produced.

Another object of the present invention is to provide a novel production process of a poly(arylene sulfide), by which a poly(arylene sulfide) having an optionally high melt viscosity and more improved in the reactivity with a silane coupling agent compared with conventional products can be stably and efficiently produced.

The present inventors have carried out an extensive investigation with a view toward achieving the above objects. As a result, the inventors have conceived of a process, in which a production process of a PAS comprising a first-stage polymerization step in a uniformly dissolved state of a reaction mixture and a second-stage polymerization step in a phase-separated state is adopted, and at this time, a charging mixture containing an organic amide solvent, a sulfur source, an alkali metal hydroxide, water and a dihalo-aromatic compound and having a pH of at least 12.5 is first prepared, the charging mixture is heated in the first-stage polymerization step to initiate a polymerization reaction and a phase separation agent is then added into the reaction system in the second-stage polymerization step and at the same time a specific amount of an alkali metal hydroxide is added at a time or in portions to continue the polymerization reaction.

According to the production process of the present invention, a PAS excellent in the reactivity with the silane coupling agent can be stably and surely produced. According to the production process of the present invention, a PAS having a melt viscosity on a desired level and high reactivity can also be efficiently produced by a short-time polymerization process. According to the production process of the present invention, a PAS, which is beyond the level of conventional products in the reactivity with the silane coupling agent, can be further produced. The present invention has been led to completion on the basis of these findings.

According to the present invention, there is thus provided a process for producing a poly(arylene sulfide) by polymerizing a sulfur source and a dihalo-aromatic compound in an organic amide solvent, which comprises the following steps 1 to 3:

(1) a charging step 1 of preparing a charging mixture containing an organic amide solvent, a sulfur source (hereinafter referred to as "charged sulfur source"), an alkali metal hydroxide, water and a dihalo-aromatic compound and having a pH of at least 12.5;

(2) a first-stage polymerization step 2 of heating the charging mixture to a temperature of 170 to 270° C. to initiate a polymerization reaction, thereby forming a prepolymer that a conversion of the dihalo-aromatic compound is at least 50%; and (3) a second-stage polymerization step 3 of adding a phase separation agent into the reaction system containing the prepolymer and adding an alkali metal hydroxide in an amount corresponding to 1 to 10 mol % per mol of the charged sulfur source at a time or in portions, thereby continuing the polymerization reaction at a temperature of 240 to 290° C.

BEST MODE FOR CARRYING OUT THE INVENTION

1. Sulfur Source

In the present invention, an alkali metal sulfide, an alkali metal hydrosulfide or a mixture thereof is used as a sulfur source. Hydrogen sulfide may also be used as a sulfur source. More specifically, when an alkali metal hydroxide (for example, NaOH) is present in excess in a vessel, hydrogen sulfide is brown into the vessel, whereby an alkali metal sulfide (for example, $Na_2S$) can be formed. An alkali metal hydrosulfide or a sulfur source containing the alkali metal sulfide as a main component is preferred as the sulfur source.

As examples of the alkali metal hydrosulfide, may be mentioned lithium hydrosulfide, sodium hydrosulfide, potassium hydrosulfide, rubidium hydrosulfide, cesium hydrosulfide and mixtures of two or more compounds thereof. However, the alkali metal hydrosulfide is not limited thereto. The alkali metal hydrosulfide may be used in any form of an anhydride, a hydrate and an aqueous solution. Among these, sodium hydrosulfide and lithium hydrosulfide are preferred in that they are industrially available on the cheap. The alkali metal hydrosulfide is preferably used as an aqueous mixture (i.e., a mixture with water having fluidity) such as an aqueous solution from the viewpoints of processing operation, metering, etc.

In general, a small amount of an alkali metal sulfide is secondarily produced in a production process of the alkali metal hydrosulfide. A small amount of the alkali metal sulfide may be contained in the alkali metal hydrosulfide used in the present invention. The alkali metal hydrosulfide tends to become a stable state when it contains a small amount of the alkali metal sulfide. Further, the content of the alkali metal sulfide is preferably not very high even from the viewpoint of easy control of the pH of the mixture for polymerization reaction.

When the mixture of the alkali metal hydrosulfide and the alkali metal sulfide is used as the sulfur source, thus, the same mixture is preferably a mixture comprising the alkali metal hydrosulfide as a main component, more preferably a mixture containing more than 50 mol % of the alkali metal hydrosulfide and less than 50 mol % of the alkali metal sulfide.

Further, when the sulfur source is a mixture of the alkali metal hydrosulfide and the alkali metal sulfide, the composition thereof is preferably composed of 70 to 99.5 mol % of the alkali metal hydrosulfide and 0.5 to 30 mol % of the alkali metal sulfide, more preferably 90 to 99.5 mol % of the alkali metal hydrosulfide and 0.5 to 10 mol % of the alkali metal sulfide, still more preferably 95 to 99.5 mol % of the alkali metal hydrosulfide and 0.5 to 5 mol % of the alkali metal sulfide, particularly preferably 97 to 99.5 mol % of alkali metal hydrosulfide and 0.5 to 3 mol % of the alkali metal hydroxide from the viewpoint of easy control of the pH in the polymerization reaction system.

In this case, the total molar quantity of the alkali metal hydrosulfide and the alkali metal sulfide becomes a molar quantity of the charged sulfur source (may be referred to as "available sulfur source"). When a dehydration step is arranged prior to the charging step, this total molar quantity becomes a molar quantity of the charged sulfur source after the dehydration step.

As examples of the alkali metal sulfide, may be mentioned lithium sulfide, sodium sulfide, potassium sulfide, rubidium sulfide, cesium sulfide and mixtures of two or more compounds thereof. However, the alkali metal sulfide is not limited thereto. The alkali metal sulfide may be used in any form of an anhydride, a hydrate and an aqueous solution. Among these, sodium sulfide is preferred in that it is industrially available on the cheap and easy to handle. As these alkali metal sulfides, may also be used those generally marketed in the form of a hydrate in addition to those contained in alkali metal hydrosulfides as by-products. Examples of the hydrate of the alkali metal sulfide include sodium sulfide nonahydrate ($Na_2S.9H_2O$) and sodium sulfide pentahydrate ($Na_2S.5H_2O$). The alkali metal sulfide is preferably used as an aqueous mixture (i.e., a mixture with water having fluidity) such as an aqueous solution from the viewpoints of processing operation, metering, etc.

2. Alkali Metal Hydroxide

Examples of the alkali metal hydroxide include lithium hydroxide, sodium hydroxide, potassium hydroxide, rubidium hydroxide, cesium hydroxide and mixtures of two or more compounds thereof. However, the alkali metal hydroxide is not limited thereto. Among these, sodium hydroxide is preferred in that it is industrially available on the cheap. The alkali metal hydroxide is preferably used as an aqueous mixture (i.e., a mixture with water having fluidity) such as an aqueous solution from the viewpoint of handling property such as metering.

3. Dihalo-Aromatic Compound

The dihalo-aromatic compound used in the present invention is a dihalogenated aromatic compound having 2 halogen atoms directly bonded to the aromatic ring. Specific examples of the dihalo-aromatic compound include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides and dihalodiphenyl ketones.

Here, the halogen atom means each atom of fluorine, chlorine, bromine and iodine, and 2 halogen atoms in the same dihalo-aromatic compound may be the same or different from each other. These dihalo-aromatic compounds may be used either singly or in any combination thereof.

The charged amount of the dihalo-aromatic compound is generally 0.90 to 1.50 mol, preferably 0.95 to 1.20 mol, more preferably 1.00 to 1.09 mol per mol of the sulfur source (alkali metal sulfide and/or alkali metal hydrosulfide) remaining in the system after the dehydration step.

4. Molecular Weight Modifier, and Branching or Crosslinking Agent

In order to form a terminal of a specific structure in a PAS formed or modify a polymerization reaction or a molecular weight, a monohalo-compound (may not be always an aromatic compound) may be used in combination. In order to form a branched or crosslinked polymer, a polyhalo-compound (may not be always an aromatic compound), to which at least 3 halogen atoms are bonded, an active hydrogen-containing halogenated aromatic compound, a halogenated aromatic nitro compound or the like may also be used in combination. Preferable examples of the polyhalo-compound as a branching or crosslinking agent include trihalobenzenes.

5. Organic Amide Solvent

In the present invention, an organic amide solvent that is an aprotic polar organic solvent is used as a solvent for the dehydration reaction and polymerization reaction. The organic amide solvent is preferably stable to an alkali at a high temperature. Specific examples of the organic amide solvent include amide compounds such as N,N-dimethylformamide and N,N-dimethylacetamide; N-alkylcaprolactam compounds such as N-methyl-ε-caprolactam; N-alkylpyrrolidone compounds or N-cycloalkylpyrrolidone compounds such as N-methyl-2-pyrrolidone and N-cyclohexyl-2-pyrrolidone; N,N-dialkylimidazolidinone compounds such as 1,3-dialkyl-2-imidazolidinones; tetraalkylurea compounds such as tetramethylurea; and hexaalkylphosphoric triamide compounds such as hexamethylphosphoric triamide. These organic amide solvents may be used either singly or in any combination thereof.

Among these organic amide solvents, N-alkyl-pyrrolidone compounds, N-cycloalkylpyrrolidone compounds, N-alkyl-caprolactam compounds and N,N-dialkylimidazolidinone compounds are preferred, and N-methyl-2-pyrrolidone (NMP), N-methyl-ε-caprolactam and 1,3-dialkyl-2-imidazolidinones are particularly preferably used. The amount of the organic amide solvent used in the polymerization reaction in the present invention is generally within a range of 0.1 to 10 kg per mol of the sulfur source.

6. Polymerization Aid

In order to promote the polymerization reaction to obtain a PAS having a high polymerization degree in a short period of time, various kinds of polymerization aids may be used in the present invention as needed. Specific examples of the polymerization aids include metal salts of organic sulfonic acids, lithium halides, metal salts of organic carboxylic acids and alkali metal salts of phosphoric acid, which are generally publicly known as polymerization aids for PASs. Among these, metal salts of organic carboxylic acids are particularly preferred because they are cheap. The amount of the polymerization aid used varies with the kind of the compound used. However, it is generally within a range of 0.01 to 10 mol per mol of the charged sulfur source.

7. Dehydration Step

In the present invention, a PAS is produced from a sulfur source and a dihalo-aromatic compound in an organic amide solvent according to a production process comprising the above-described steps 1 to 3. In the charging step 1, a charging mixture containing the organic amide solvent, the sulfur source, the alkali metal hydroxide, water and the dihalo-aromatic compound and having a pH of at least 12.5 is prepared. In general, a dehydration step of heating a mixture containing the organic amide solvent, the sulfur source and the alkali metal hydroxide to discharge at least a part of a distillate containing water from the interior of the system containing the mixture to the exterior of the system is arranged prior to such a charging step 1.

The sulfur source often contains water such as water of hydration (water of crystallization). When the sulfur source and the alkali metal hydroxide are used as aqueous mixtures, water is contained as a medium. The polymerization reaction of the sulfur source with the dihalo-aromatic compound is affected by the content of water present in the polymerization reaction system. Thus, the dehydration step is generally arranged prior to the polymerization step to control the water content in the polymerization reaction system.

In the dehydration step, a mixture containing the organic amide solvent, the sulfur source (preferably, a sulfur source containing the alkali metal hydrosulfide) and a part of an overall charged amount of the alkali metal hydroxide is heated, desirably, under an inert gas atmosphere to discharge at least a part of a distillate containing water from the interior of the system containing the mixture to the exterior of the system. The dehydration step is conducted within a reaction vessel, and the discharge of the distillate to the exterior of the system is generally conducted by discharge out of the reaction vessel. Examples of water to be dehydrated in the dehydration step include water of hydration contained in the respective raw materials charged in the dehydration step, a water medium of the aqueous mixtures and water secondarily produced by a reaction between the respective raw materials.

The charging of the respective raw materials into the reaction vessel is conducted within a temperature range of generally from about 20° C. to about 300° C., preferably from about 20° C. to 200° C. The charging of the respective raw materials may not be in order, and the respective raw materials may be additionally charged in the course of the dehydration process. An organic amide solvent is used in the dehydration step. The organic amide solvent used in the dehydration step is preferably the same as the organic amide solvent used in the polymerization step, with N-methyl-2-pyrrolidone being more preferred in that it is easy to be industrially available. The amount of the organic amide solvent used is generally about 0.1 to 10 kg per mol of the sulfur source charged into the reaction vessel.

The dehydration process is conducted by charging the raw materials into the reaction vessel and then heating the mixture containing the respective components in a temperature range of generally up to 300° C., preferably 100 to 250° C. for generally 15 minutes to 24 hours, preferably 30 minutes to 10 hours. Heating methods include a method of retaining a fixed temperature, a method of raising the temperature either stepwise or continuously and a method of combining both methods. The dehydration step is conducted by, for example, a batch system, a continuous system or a combined system thereof. An apparatus for conducting the dehydration step may be the same as a polymerization vessel (reactor) used in the polymerization step or different from it.

In the dehydration step, water and the organic amide solvent are distilled out in the form of vapor. Accordingly, a distillate contains water and the organic amide solvent. A part of the distillate may be refluxed into the system for the purpose of inhibiting the discharge of the organic amide solvent out of the system. However, at least a part of the distillate containing water is discharged out of the system for the purpose of controlling the water content. A minor amount of the organic amide solvent is discharged together with water out of the system when the distillate is discharged out of the system.

In this dehydration step, hydrogen sulfide resulting from the sulfur source is volatilized out. When the mixture is heated in the dehydration step, the sulfur source reacts with water by the heating to form hydrogen sulfide and an alkali metal hydroxide, and gaseous hydrogen sulfide is volatized out. For example, 1 mol of an alkali metal hydrosulfide reacts with 1 mol of water to form 1 mol of hydrogen sulfide and 1 mol of an alkali metal hydroxide. The hydrogen sulfide volatilized out is also discharged out of the system attending on the discharging of at least a part of the distillate containing water.

The amount of the sulfur source in the mixture remaining in the system after the dehydration step is reduced from the amount of the sulfur source charged due to the hydrogen sulfide volatilized out of the system in the dehydration step. When a sulfur source comprising the alkali metal hydrosulfide as a main component is used, the amount of the sulfur source in the mixture remaining in the system after the dehydration step is substantially equal to a value obtained by subtracting a molar amount of hydrogen sulfide volatilized out of the system from a molar amount of the sulfur source charged. The sulfur source in the mixture remaining in the system after the dehydration step may also be referred to as "an available sulfur source". In other words, this available sulfur source is "a charged sulfur source" in the charging step 1 and the subsequent polymerization steps. That is to say, "the charged sulfur source" in the present invention means an available sulfur source present in the mixture after the dehydration step.

The available sulfur source after the dehydration step is interpreted as a mixture containing the alkali metal hydrosulfide, the alkali metal sulfide and the like. However, no particular limitation is imposed on the specific form thereof. Since it has heretofore been said that when an alkali metal hydrosulfide and an alkali metal hydroxide are heated in an organic amide solvent, they react with each other in situ to form an alkali metal sulfide, there is a possibility that when an alkali metal hydroxide is added in the dehydration step, an alkali metal sulfide may be formed by the reaction of the alkali metal hydrosulfide with the alkali metal hydroxide.

On the other hand, according to the results of recent researches on polymerization mechanisms of PASs, it is inferred that an alkali metal hydroxide reacts with an organic amide solvent by heating to form an alkali metal alkylaminoalkylcarboxylate, and this alkali metal alkylaminoalkylcarboxylate forms a complex with an alkali metal hydrosulfide.

Accordingly, no particular limitation is imposed on the specific form of the available sulfur source as a compound, but it is sure that the available sulfur source is subjected to a polymerization reaction with the dihalo-aromatic compound to form a PAS, and a molar ratio of the available sulfur source to the dihalo-aromatic compound greatly affects the polymerization reaction. Since the amount of the sulfur source charged first in the dehydration step is reduced due to the volatilization of hydrogen sulfide out of the system after the dehydration step, it is necessary to determine an amount of the sulfur source (available sulfur source) contained in the mixture remaining in the system after the dehydration step on the basis of the amount of the hydrogen sulfide volatilized out of the system. It is important to exactly determine the amount of the available sulfur source in that a molar ratio of the available sulfur source to the alkali metal hydroxide and a molar ratio of the available sulfur source to the dihalo-aromatic compound are controlled.

In the dehydration step, the dehydration is conducted until the content of water comprising water of hydration, a water medium, secondarily produced water, etc. is lowered within a range of necessary amounts. In the dehydration step, the dehydration is desirably conducted until the water content is reduced to 0.0 to 2.0 mol, preferably 0.5 to 1.8 mol per mol of the available sulfur source. When the water content becomes too low in the dehydration step, water may be added in the charging step prior to the polymerization step to regulate the water content to a desired value.

The alkali metal sulfide forms an alkali metal hydroxide by its equilibrium reaction with water. In the production process making use of the sulfur source comprising the alkali metal hydrosulfide as a main component, a molar ratio of the charged amount of the alkali metal hydroxide to a mol of the available sulfur source is calculated out in view of the amount of the alkali metal sulfide that is a minor component. When hydrogen sulfide is volatilized out of the system in the dehydration step, an alkali metal hydroxide in an amount almost equal to the number of moles of the hydrogen sulfide volatilized out is formed. Therefore, the molar ratio of the charged amount of the alkali metal hydroxide to a mol of the available sulfur source is calculated out in view of the amount of the hydrogen sulfide volatilized out as well.

In the dehydration step, it is preferable that a mixture containing the organic amide solvent, the sulfur source including the alkali metal hydrosulfide and the alkali metal hydroxide in a proportion of 0.90 to 1.05 mol per mol of the charged sulfur source be heated to discharge at least a part of a distillate containing water from the interior of the system containing the mixture to the exterior of the system.

If the molar ratio of the alkali metal hydroxide to a mol of the sulfur source is too low in this step, the amount of hydrogen sulfide volatilized off in the dehydration step becomes great, which tends to incur reduction in productivity due to lowering of the amount of the charged sulfur source or cause abnormal reactions and deterioration of a PAS formed due to increase of a persulfide component in the charged sulfur source remaining after the dehydration. If the molar ratio of the alkali metal hydroxide to a mol of the sulfur source is too high, change in properties of the organic amide solvent may be increased in some cases.

An apparatus for conducting the dehydration step may be the same as a reaction vessel (reactor) used in the subsequent polymerization step or different from it. A material of the apparatus is preferably a corrosion resistant material such as titanium. In the dehydration step, a part of the organic amide solvent is generally discharged together with water outside the reaction vessel. At that time, hydrogen sulfide is discharged as a gas outside the system.

8. Charging Step

In the charging step, a charging mixture containing the organic amide solvent, the sulfur source, the alkali metal hydroxide, water and the dihalo-aromatic compound and having a pH of at least 12.5 is prepared. Since the dehydration step is generally often arranged prior to the charging step, it is necessary to control the amounts of the respective components and the pH of such a mixture in view of the amounts of the respective components in the mixture obtained in the dehydration step.

In the present invention, a charging mixture containing the organic amide solvent, the sulfur source (charged sulfur source) including the alkali metal hydrosulfide, the alkali metal hydroxide in a proportion of 0.950 to 1.090 mol per mol of the charged sulfur source, water in a proportion of 0.500 to 2.000 mol per mol of the charged sulfur source and the dihalo-aromatic compound and having a pH of at least 12.5 is preferably prepared in the charging step. The amount of "the charged sulfur source" (available sulfur source) is calculated out by subtracting "a molar amount of hydrogen sulfide volatilized off in the dehydration step" from "a molar amount of the sulfur source charged in the dehydration step".

The pH of the charging mixture and the ratio (molar ratio) among the amounts of the respective components are generally controlled by adding other components than the charged sulfur source into the mixture obtained in the dehydration step. For example, when the amounts of the alkali metal hydroxide and water in the mixture obtained in the dehydration step are small, these components are added in the charging step. The dihalo-aromatic compound is added in the charging step.

When hydrogen sulfide is volatilized off in the dehydration step, an alkali metal hydroxide is produced by an equilibrium reaction and comes to remain in the mixture after the dehydration step. Accordingly, it is necessary to exactly grasp these amounts to determine a molar ratio of the alkali metal hydroxide to "the charged sulfur source" in the charging step. The number of moles of the alkali metal hydroxide is calculated out on the basis of the number of moles of an alkali metal hydroxide formed with hydrogen sulfide formed upon the dehydration, the number of moles of the alkali metal hydroxide added prior to the dehydration and the number of moles of the alkali metal hydroxide in the charging step.

If the molar ratio of the alkali metal hydroxide to a mol of the charged sulfur source is too high, in some cases, change in properties of the organic amide solvent may be increased, or abnormal reactions or decomposition reactions may be caused upon polymerization. In addition, the lowering of the yield and quality of a PAS formed is often caused. The molar ratio of the alkali metal hydroxide to a mol of the charged sulfur source is preferably 0.980 to 1.030 mol, more preferably 1.000 to 1.030 mol. The molar ratio of the alkali metal hydroxide to a mol of the charged sulfur source is controlled within the above-described range in the first-stage polymerization step, whereby the pH of the resulting mixture can be easily controlled to at least 12.5, thereby stably performing the polymerization reaction to easily provide a high-quality PAS.

The proportion of the respective components such as the alkali metal hydroxide are controlled in such a manner that the pH of the charging mixture is at least 12.5, preferably 12.5 to 13.5, more preferably 12.6 to 13.3. In the present invention, the charging mixture is heated in the first-stage polymerization step to initiate a polymerization reaction between the sulfur source and the dihalo-aromatic compound. If the pH of the charging mixture upon the initiation of this first-stage polymerization is lower than 12.5, it is difficult to provide a PAS having good reactivity with the silane coupling agent even when an alkali metal hydroxide is added in the course of the first-stage polymerization. A too high pH of the charging mixture indicates that the amount of an existing alkali metal hydroxide is too great, so that in some cases, change in properties of the organic amide solvent may be increased, or abnormal reactions or decomposition reactions may be caused upon polymerization.

A charging mixture containing a sulfur source containing more than 50 mol % of the alkali metal hydrosulfide and less than 50 mol % of the alkali metal sulfide is preferably prepared in the charging step. The sulfur source having such a composition is actually prepared in the dehydration step.

In the charging step, a charging mixture containing the dihalo-aromatic compound in a proportion of preferably 0.950 to 1.200 mol, more preferably 1.000 to 1.090 mol per mol of the charged sulfur source is desirably prepared.

In the charging step, the amount of the organic amide solvent is desirably controlled within a range of generally 0.1 to 10 kg, preferably 0.15 to 1 kg per mol of the charged sulfur source. The amount of the organic amide solvent may be changed in the course of the polymerization steps so far as it falls within the above range.

9. Polymerization Step

In the present invention, a polymerization reaction is conducted by at least two polymerization steps of the first-stage polymerization step and the second-stage polymerization step. More specifically, the polymerization steps of the present invention include the first-stage polymerization step of heating the charging mixture to a temperature of 170 to 270° C. to initiate a polymerization reaction, thereby forming a prepolymer that a conversion of the dihalo-aromatic compound is at least 50%; and the second-stage polymerization step of adding a phase separation agent into the reaction system containing the prepolymer and adding an alkali metal hydroxide in an amount corresponding to 1 to 10 mol % per mol of the charged sulfur source at a time or in portions, thereby continuing the polymerization reaction at a temperature of 240 to 290° C.

As a heating method, is used a method of retaining a fixed temperature, a method of raising the temperature either stepwise or continuously or a combination of both methods. The polymerization temperature may also be lowered in the course of the polymerization reaction. The polymerization reaction time is within a range of generally from 10 minutes to 72 hours, desirably from 30 minutes to 48 hours.

The amount of the organic amide solvent used in the polymerization step is within a range of generally from 0.1 to 10 kg, preferably from 0.15 to 1 kg per mol of the charged sulfur source existing in the polymerization step. The amount may be changed in the course of the polymerization reaction so far as it falls within this range.

As described above, the first-stage polymerization step and second-stage polymerization step may be respectively composed of a plurality of steps that temperature conditions are changed stepwise, or water and the alkali metal hydroxide are added in portions.

In the first-stage polymerization step, the polymerization reaction is generally conducted in the reaction system that the respective components including a polymer formed are uniformly dissolved. In the second-stage polymerization step, the polymerization reaction is generally continued in a state phase-separated into a concentrated polymer phase and a dilute polymer phase by adding a phase separation agent. Since the polymerization reaction is generally conducted under stirring, a phase-separation polymerization reaction is actually conducted in a state that the concentrated polymer phase has been dispersed as droplets in the organic amide solvent (dilute polymer phase). The phase-separated state comes to be clearly observed with the progress of the second-stage polymerization reaction.

The system of the polymerization reaction may be a batch system, a continuous system or a combination of both systems. In the batch-wise polymerization, 2 or more reaction vessels may be used for the purpose of shortening the polymerization cycle time.

9.1. First-Stage Polymerization Step

In the first-stage polymerization step, the charging mixture is heated to a temperature of 170 to 270° C. to initiate a polymerization reaction, thereby forming a prepolymer that a conversion of the dihalo-aromatic compound is at least 50%. The polymerization temperature in the first-stage polymerization step is preferably selected from a range of 200 to 260° C. in that side reactions and decomposition reactions are inhibited.

The conversion of the dihalo-aromatic compound is preferably 50 to 98%. The conversion of the dihalo-aromatic compound can be calculated out on the basis of an amount of the dihalo-aromatic compound remaining in the reaction mixture, which is determined by gas chromatography, the charged amount of the dihalo-aromatic compound and the charged amount of the sulfur source (see, for example, Japanese Patent Application Laid-Open No. 61-7332).

In the first-stage polymerization step, it is necessary to initiate the polymerization reaction using the charging mixture having a pH of at least 12.5. The amount of at least one of water, the alkali metal hydroxide and the organic amide solvent may be changed in the course of the polymerization reaction so far as this condition is kept. For example, water and the alkali metal hydroxide may be added into the reaction system in the course of the polymerization. In the first-stage polymerization step, however, it is generally preferable that the charging mixture prepared in the charging step be used to initiate the polymerization reaction and complete the first-stage polymerization reaction.

9.2. Second-Stage Polymerization Step

In the second-stage polymerization step, a phase separation agent is added into the reaction system containing the prepolymer formed in the first-stage polymerization step, and an alkali metal hydroxide in an amount corresponding to 1 to 10 mol % per mol of the charged sulfur source is added at a time or in portions, thereby continuing the polymerization reaction at a temperature of 240 to 290° C.

The polymerization reaction system (polymerization reaction mixture) is phase-separated into a concentrated polymer phase and a dilute polymer phase (a phase mainly comprising the organic amide solvent) by adding the phase separation agent. This phase separation may be caused in the course of the second-stage polymerization step.

As the phase separation agent, may be used a substance, which is known in this technical field to function as a phase separation agent, such as an alkali metal carboxylate such as sodium acetate, lithium acetate, lithium propionate or lithium benzoate; or water. Among these, water is preferred in that its cost is cheap, and a post treatment is easy.

In the second-stage polymerization step, it is preferable to adopt a process of adding water as the phase separation agent in such a manner that the content of water in the reaction system is higher than 2.0 mol, but not higher than 10 mol per mol of the charged sulfur source. When water is added as the phase separation agent in the second-stage polymerization step, water is preferably added in such a manner that the content of water in the reaction system is more preferably 2.300 to 7.000 mol, particularly preferably 2.500 to 5.000 mol per mol of the charged sulfur source.

In the production process according to the present invention, the alkali metal hydroxide in an amount corresponding to 1 to 10 mol % per mol of the charged sulfur source is added at a time or in portions upon the addition of the phase separation agent or at any point of time on and after the addition of the phase separation agent in the second-stage polymerization step. It has been surprisingly found that the alkali metal hydroxide is added in the second-stage polymerization step, in which the phase-separation polymerization reaction is conducted, in the production process comprising the two-stage polymerization process that is adopted in the present invention, whereby a PAS high in melt viscosity and excellent in the reactivity with the silane coupling agent can be provided in a short polymerization time that has conventionally not been found.

Even when the two-stage polymerization process is adopted, it is difficult to stably obtain the PAS high in melt viscosity according to the reaction conditions when no alkali metal hydroxide is added in the second-stage polymerization step. In addition, even when a PAS relatively high in melt viscosity is obtained, the reactivity of such a PAS with the silane coupling agent is lowered. Even when the alkali metal hydroxide is added in the second-stage polymerization step, a PAS high in melt viscosity cannot be obtained when no phase separation agent is added.

On the other hand, according to the production process of the present invention, a PAS having a high melt viscosity and excellent reactivity with the silane coupling agent can be efficiently provided. When the reactivity with the silane coupling agent is evaluated by the above-described "reactivity with AS", the "reactivity with AS" of the PAS obtained by the production process according to the present invention exceeds 2.0 and often 2.5. The number of active terminals, which are presumed to react with the silane coupling agent, decreases when the melt viscosity of the PAS becomes high. According to the production process of the present invention, however, a PAS having high-level reactivity with the silane coupling agent can be provided even when its melt viscosity is high.

In the second-stage polymerization step, the alkali metal hydroxide is preferably added under control in such a manner that the total amount of the alkali metal hydroxide is preferably 1.010 to 1.100 mol, more preferably 1.020 to 1.080 mol, particularly preferably 1.020 to 1.060 per mol of the charged sulfur source. The total amount of the alkali metal hydroxide is a total of the amount of the alkali metal hydroxide present in the charging mixture and the amount of the alkali metal hydroxide added in the polymerization process.

The time the alkali metal hydroxide is added may be almost the same as the time the phase separation agent is added or in the course of the second-stage polymerization. The alkali metal hydroxide may also be added in portions. When the alkali metal hydroxide is added in the form of an aqueous mixture in portions, the phase-separation polymerization in the second-stage polymerization step may also be accelerated.

The polymerization temperature in the second-stage polymerization step is preferably 240 to 280° C., more preferably 240 to 270° C. The polymerization temperature may be retained at a fixed temperature, or may be raised or lowered stepwise as needed.

10. Post Treatment Step

In the production process according to the present invention, a post treatment after the polymerization reaction may be conducted in accordance with a method known per se in the art. For example, when the reaction mixture is cooled after completion of the polymerization reaction, a slurry containing a polymer is obtained. The product slurry cooled is separated by filtration as it is or after diluted with water or the like, and the resulting filter cake is washed and filtered repeatedly, and dried, whereby a PAS can be collected.

According to the production process of the present invention, a granular polymer can be formed, so that the granular polymer is preferably separated from the reaction mixture by a method of sieving the polymer by means of a screen because the polymer can be easily separated from by-products, oligomers, etc. The product slurry may be subjected to sieving as it is in a high-temperature state, thereby collecting the polymer.

After the separation (sieving) by filtration, the PAS is preferably washed with the same organic amide solvent as the polymerization solvent, or an organic solvent such as a ketone (for example, acetone) or an alcohol (for example, methanol). The PAS may be washed with hot water or the like. The PAS formed may also be treated with an acid or a salt such as ammonium chloride.

11. PAS

According to the production process of the present invention, a PAS having a melt viscosity of generally 5 to 800 Pa·s, preferably 10 to 500 Pa·s, more preferably 15 to 400 Pa·s as measured at a temperature of 310° C. and a shear rate of 1216 sec$^{-1}$ can be provided.

Since the PAS obtained by the production process according to the present invention is high in the reactivity with the silane coupling agent, it may be used in a wide variety of applications. According to the production process of the present invention, a PAS having a melt viscosity on the same level as a conventional PAS can be produced in a short polymerization time compared with the conventional processes.

According to the production process of the present invention, a PAS having a high melt viscosity and high reactivity can be provided. In this case, the melt viscosity of the PAS may also be controlled to at least 50 Pa·s or 80 Pa·s, or further at least 100 Pa·s.

According to the production process of the present invention, a PAS, which has a ratio MV2/MV1 of a melt viscosity MV2 of the PAS as measured at a temperature of 310° C. and a shear rate of 1216 sec$^{-1}$ after the reaction with γ-aminopropyltriethoxysilane to a melt viscosity MV1 before the reaction exceeding 2.0, can be provided. This ratio MV2/MV1 may also be referred to as "reactivity with AS".

A higher ratio indicates that the PAS has high reactivity with the silane coupling agent. The high reactivity with γ-aminopropyltriethoxysilane (may be referred to as "aminosilane") indicates that the melt viscosity of a composition composed of the PAS and the aminosilane becomes high, and so its toughness is increased.

The composition composed of the PAS and the aminosilane differs from the case of the PAS alone in the relation of the viscosity to the shear rate and exhibits such effects that the occurrence of flash in melt molding is reduced, in addition to the increase of the viscosity in the molten state, so that selection latitude of melt processing conditions can be widened. If this ratio does not exceed 2.0, such a polymer tends to lessen the effect to develop such properties. When the production process of the PAS according to the present invention is used, MV2/MV1 may also be stabilized. When MV2/MV1 varies, the melt viscosity of a composition comprising the PAS and the aminosilane tends to vary. Thus, such a polymer is not preferred. Accordingly, it is desirable to control the ratio within a certain range, and the present invention can also meet the requirement.

In the PAS obtained by the production process according to the present invention, the ratio MV2/MV1 may also exceed 2.5. When the melt viscosity of a PAS is increased, reaction-active sites, which seem to be present in plenty at terminals, are decreased, so that it is predicted that such a PAS shows a tendency to lower the ratio MV2/MV1. However, the PAS obtained by the production process according to the present invention can retain the ratio on a high level even when the polymerization conditions are preset so as to give a high melt viscosity. The upper limit of this ratio is generally 4.0, often 3.5.

The PAS obtained by the production process according to the present invention preferably has a melt viscosity of 10 to 500 Pa·s and a ratio MV2/MV1 exceeding 2.0. Since a PAS having a high ratio MV2/MV1 though its melt viscosity is low can be efficiently produced, however, such a PAS can be used as compositions with a silane coupling agent in various applications. On the other hand, even when the ratio MV2/MV1 is somewhat lowered by increasing the melt viscosity, the melt viscosity can be designed to be sufficiently high, and the ratio MV2/MV1 can also be retained on a high level, so that such a PAS can be used as compositions with a silane coupling agent in various applications.

The PAS obtained by the production process according to the present invention may be molded or formed into various injection-molded products or extruded products such as sheets, films, fibers and pipes either singly or by incorporating various kinds of inorganic fillers, fibrous fillers and/or various kinds of synthetic resins, if desired, as it is or after subjected to oxidative crosslinking. The PAS obtained by the production process according to the present invention is good in color tone. A compound of the PAS obtained by the production process according to the present invention is little in the amount of volatile matter generated and is also suitable for use in fields of electronic equipments and the like, in which inhibition of volatile matter is expected. The PAS is particularly preferably PPS.

EXAMPLES

The present invention will hereinafter be described more specifically by the following Examples and Comparative Examples. Measuring methods of various properties, physical properties and the like are as follows.

(1) Yield

Assuming that all the available sulfur source existing in a reaction vessel after a dehydration step was converted to a polymer, the weight (theoretical amount) of that polymer was used as a reference value to calculate out a proportion (% by weight) of the weight of a polymer actually collected to the reference value as a yield of the polymer.

(2) Melt Viscosity

A melt viscosity was measured by using about 20 g of a dry polymer by means of CAPIROGRAPH 1-C (manufactured by Toyo Seiki Seisakusho, Ltd.). At this time, a flat die of 1 mm in diameter×10 mm in length was used as a capillary, and the temperature was set to 310° C. After the polymer sample was placed in the apparatus and held for 5 minutes, the melt viscosity was measured at a shear rate of 1216 sec$^{-1}$.

(3) Reactivity with Silane Coupling Agent

To 100 parts by weight of a polymer was added 0.8 part by weight of γ-aminopropyltriethoxysilane (hereinafter abbreviated as "aminosilane"), and they were well blended. Thereafter, 20 g of the blend was taken out to measure a melt viscosity thereof under the same melt viscosity measuring conditions as described above. The reactivity of the polymer was indicated by a ratio to a melt viscosity of the polymer, to which no aminosilane was added, under the same conditions.

In other words, the reactivity of the polymer was evaluated by a ratio MV2/MV1 (increase ratio of melt viscosity) of the melt viscosity MV2 of the blend of the polymer and aminosilane to the melt viscosity MV1 of the polymer. A higher ratio indicates that the reactivity of the polymer is higher. This reactivity is abbreviated as "reactivity with AS".

Example 1

1. Dehydration Step:

An aqueous sodium hydrosulfide (NaSH) solution having an analytical value of 62.29% by weight as measured by iodimetry was used as a sulfur source. This aqueous solution contains 22.00 mol of a sulfur source (S). The analytical value of NaSH by a neutralization titration method in this sulfur source is 60.95% by weight (21.53 mol), and 0.47 mol of sodium sulfide ($Na_2S$) is contained therein.

A 20-liter autoclave (reactor) made of titanium was charged with 1,980.3 g of the aqueous sodium hydrosulfide solution and 1,115 g (NaOH content: 20.68 mol) of a 74.18% by weight aqueous sodium hydroxide (NaOH) solution together with 6,000 g of N-methyl-2-pyrrolidone (NMP). When the sulfur source composed of sodium hydrosulfide and sodium sulfide is indicated as "S", NaOH/NaSH before dehydration is 0.96 (mol/mol), and NaOH/S is 0.94 (mol/mol).

After the interior of the reactor was purged with nitrogen gas, the contents were gradually heated to 200° C. over 2 hours and 20 minutes with stirring to distill off 901.7 g of water and 776.9 g of NMP. At this time, 0.39 mol of hydrogen sulfide ($H_2S$) was volatilized off. Accordingly, the amount of the available S (i.e., the amount of "charged sulfur source") in the reactor after the dehydration step was 21.61 mol. The amount of $H_2S$ volatilized off corresponded to 1.78 mol % based on the sulfur source charged into the reactor.

2. Charging Step:

After the dehydration step, the reactor containing 21.61 mol of the available S (charged sulfur source) was cooled down to 170° C., 3,241 g [p-dichlorobenzene (hereinafter abbreviated as "pDCB")/available S=1.020 (mol/mol)] of pDCB, 2,881 g of NMP and 88 g [total water content in the reactor/available S=1.500 (mol/mol)] of water were added, and 2.7 g of NaOH having a purity of 97% was added in such a manner that (NaOH in the reactor/available S) is 1.000 (mol/mol). NaOH (0.78 mol) produced by volatilization of $H_2S$ is contained in the reactor. The pH of the charging mixture at this time was 12.8. The pH is a value measured by means of a pH meter.

3. Polymerization Step:

While stirring the charging mixture at 250 rpm by a stirrer installed in the reactor, a reaction was conducted at 220° C.

for 1 hour, and the reaction mixture was then heated to 230° C. in 30 minutes to conduct the reaction at 230° C. for 1.5 hours (first-stage polymerization step). The conversion of pDCB upon completion of the first-stage polymerization was 92%.

Thereafter, the number of revolutions of the stirrer was increased to 400 rpm, 440 g of water and 44.6 g of NaOH were charged under pressure into the reactor [total water content in the reactor/available S=2.630 (mol/mol); total NaOH/available S=1.050 (mol/mol)] while continuing the stirring, and the contents were heated to 260° C. to conduct a reaction for 4.0 hours (second-stage polymerization step).

4. Post Treatment Step:

After completion of the reaction, the reaction mixture was cooled near to room temperature and then sifted through a 100-mesh screen to collect a granular polymer. The polymer separated washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 90%. The properties of the polymer were determined, and the results thereof are shown in Table 1.

Example 2

1. Dehydration Step:

An aqueous sodium hydrosulfide (NaSH) solution having an analytical value of 62.29% by weight as measured by iodimetry was used as a sulfur source. This aqueous solution contains 22.01 mol of a sulfur source (S). The analytical value of NaSH by a neutralization titration method in this sulfur source is 60.95% by weight (21.53 mol), and 0.48 mol of sodium sulfide ($Na_2S$) is contained therein.

A 20-liter autoclave (reactor) made of titanium was charged with 1,980.6 g of the aqueous sodium hydrosulfide solution and 1,145 g (NaOH content: 21.23 mol) of a 74.18% by weight aqueous sodium hydroxide (NaOH) solution together with 6,000 g of NMP. When the sulfur source composed of sodium hydrosulfide and sodium sulfide is indicated as "S", NaOH/NaSH before dehydration is 0.99 (mol/mol), and NaOH/S is 0.96 (mol/mol).

After the interior of the reactor was purged with nitrogen gas, the contents were gradually heated to 200° C. over 2 hours and 20 minutes with stirring to distill off 901.5 g of water and 776.9 g of NMP. At this time, 0.37 mol of hydrogen sulfide ($H_2S$) was volatilized off. Accordingly, the amount of the available S in the reactor after the dehydration step was 21.63 mol. The amount of $H_2S$ volatilized off corresponded to 1.70 mol % based on the sulfur source charged into the reactor.

2. Charging Step:

After the dehydration step, the reactor containing 21.63 mol of the available S (charged sulfur source) was cooled down to 170° C., 3,244 g [pDCB/available S=1.020 (mol/mol)] of p-dichlorobenzene (pDCB), 2,889 g of NMP and 80 g [total water content in the reactor/available S=1.500 (mol/mol)] of water were added, and 3.8 g of NaOH having a purity of 97% was added in such a manner that (NaOH in the reactor/available S) is 1.025 (mol/mol). NaOH (0.74 mol) produced by volatilization of $H_2S$ is contained in the reactor.

3. Polymerization Step:

While stirring the charging mixture at 250 rpm by a stirrer installed in the reactor, a reaction was conducted at 220° C. for 1 hour, and the reaction mixture was then heated to 230° C. in 30 minutes to conduct the reaction at 230° C. for 1.5 hours (first-stage polymerization step). The conversion of PDCB upon completion of the first-stage polymerization was 92%.

Thereafter, the number of revolutions of the stirrer was increased to 400 rpm, 440 g of water was charged under pressure into the reactor [total water content in the reactor/available S=2.630 (mol/mol)] while continuing the stirring, and the contents were heated to 260° C. to conduct a reaction for 1.0 hour, followed by charging of 29.2 g of an aqueous NaOH solution having a concentration of 74.18% by weight under pressure [total water content in the reactor/available S=2.650 (mol/mol); total NaOH/available S=1.050 (mol/mol)]. Thereafter, a reaction was additionally conducted for 3.0 hours at 260° C. (second-stage polymerization step).

4. Post Treatment Step:

After completion of the reaction, the reaction mixture was cooled near to room temperature and then sifted through a 100-mesh screen to collect a granular polymer. The polymer separated washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 93%. The data of physical properties of the polymer are shown in Table 1.

Example 3

1. Dehydration Step:

An aqueous sodium hydrosulfide (NaSH) solution having an analytical value of 62.21% by weight as measured by iodimetry was used as a sulfur source. This aqueous solution contains 19.98 mol of a sulfur source (S). The analytical value of NaSH by a neutralization titration method in this sulfur source is 61.18% by weight (19.65 mol), and 0.33 mol of sodium sulfide ($Na_2S$) is contained therein.

A 20-liter autoclave (reactor) made of titanium was charged with 1,800.3 g of the aqueous sodium hydrosulfide solution and 1,020 µg (NaOH content: 18.89 mol) of a 74.04% by weight aqueous sodium hydroxide (NaOH) solution together with 6,500 g of NMP. When the sulfur source composed of sodium hydrosulfide and sodium sulfide is indicated as "S", NaOH/NaSH before dehydration is 0.96 (mol/mol), and NaOH/S is 0.95 (mol/mol).

After the interior of the reactor was purged with nitrogen gas, the contents were gradually heated to 200° C. over 2 hours with stirring to distill off 884.7 g of water and 1,175.9 g of NMP. At this time, 0.36 mol of hydrogen sulfide ($H_2S$) was volatilized off. Accordingly, the amount of the available S in the reactor after the dehydration step was 19.62 mol. The amount of $H_2S$ volatilized off corresponded to 1.79 mol % based on the sulfur source charged into the reactor.

2. Charging Step:

After the dehydration step, the reactor containing 19.62 mol of the available S (charged sulfur source) was cooled down to 170° C., 2,971 g [pDCB/available S=1.030 (mol/mol)] of p-dichlorobenzene (pDCB), 3,505 g of NMP and 207 g [total water content in the reactor/available S=1.700 (mol/mol)] of water were added, and 1.78 g of NaOH having a purity of 97% was added in such a manner that (NaOH in the reactor/available S) is 1.000 (mol/mol). NaOH (0.71 mol) produced by volatilization of $H_2S$ is contained in the reactor.

3. Polymerization Step:

While stirring the charging mixture at 250 rpm by a stirrer installed in the reactor, a reaction was conducted at 220° C. for 4.5 hours (first-stage polymerization step). The conversion of PDCB upon completion of the first-stage polymerization was 93%.

Thereafter, the number of revolutions of the stirrer was increased to 400 rpm, 608 g of water and 40.5 g of NaOH were charged under pressure into the reactor [total water content in the reactor/available S=3.420 (mol/mol); total NaOH/available S=1.050 (mol/mol)] while continuing the stirring, and the contents were heated to 255° C. to conduct a reaction for 3.0 hours. The reaction mixture was cooled down to 245° C. over 30 minutes to conduct a reaction for 7.5 hours (second-stage polymerization step).

4. Post Treatment Step:

After completion of the reaction, the reaction mixture was cooled near to room temperature and then sifted through a 100-mesh screen to collect a granular polymer. The polymer separated washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 87%. The data of physical properties of the polymer are shown in Table 1.

Example 4

The steps of from the dehydration step to the first-stage polymerization step were conducted in the same manner as in Example 1. The second-stage polymerization step and post treatment step were preformed in the following manner.

1. Second-Stage Polymerization Step:

After completion of the first-stage polymerization step, the number of revolutions of the stirrer was increased to 400 rpm, 440 g of water and 22.3 g of NaOH were charged under pressure into the reactor [total water content in the reactor/available S=2.630 (mol/mol); total NaOH/available S=1.025 (mol/mol)] while continuing the stirring, and the contents were heated to 260° C. to conduct a reaction for 1.0 hour. After 29.2 g of an aqueous NaOH solution having a concentration of 74.18% by weight was then charged under pressure into the reactor [total water content in the reactor/available S=2.650 (mol/mol); total NaOH/available S=1.050 (mol/mol)], a reaction was additionally conducted for 3.0 hours at 260° C. (second-stage polymerization step).

2. Post Treatment Step:

After completion of the reaction, the reaction mixture was cooled near to room temperature and then sifted through a 100-mesh screen to collect a granular polymer. The polymer separated washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 91%. The data of physical properties of the polymer are shown in Table 1.

Example 5

The process was conducted in the same manner as in Example 1 except that the reaction time of the second-stage polymerization step in the polymerization step was shortened from 4.0 hours to 1.0 hour. The yield of the granular polymer thus obtained was 86%. The data of physical properties of the polymer are shown in Table 1.

TABLE 1

|  | Ex. 1 | Ex. 2 | Ex. 3 | Ex. 4 | Ex. 5 |
|---|---|---|---|---|---|
| First-stage polymerization |  |  |  |  |  |
| pDCB/S (mol/mol) | 1.020 | 1.020 | 1.030 | 1.020 | 1.020 |
| $H_2O/S$ (mol/mol) | 1.500 | 1.500 | 1.700 | 1.500 | 1.500 |
| NaOH/S (mol/mol) | 1.000 | 1.025 | 1.000 | 1.000 | 1.000 |
| Initial pH | 12.8 | 13.0 | 12.7 | 12.8 | 12.8 |
| Temp./time (° C./h) | 220/1.0 | 220/1.0 | 220/4.5 | 220/1.0 | 220/1.0 |
|  | 230/1.5 | 230/1.5 |  | 230/1.5 | 230/1.5 |
| After later addition of NaOH |  |  |  |  |  |
| $H_2O/S$ (mol/mol) | — | — | — | — | — |
| NaOH/S (mol/mol) | — | — | — | — | — |
| Temp./time (° C./h) | — | — | — | — | — |
| Second-stage polymerization |  |  |  |  |  |
| $H_2O/S$ (mol/mol) | 2.630 | 2.630 | 3.420 | 2.630 | 2.630 |
| NaOH/S (mol/mol) | 1.050 | 1.025 | 1.050 | 1.025 | 1.050 |
| Temp./time (° C./h) | 260/4.0 | 260/1.0 | 255/3.0 | 260/1.0 | 260/1.0 |
|  |  |  | 245/7.5 |  |  |
| After later addition of NaOH |  |  |  |  |  |
| $H_2O/S$ (mol/mol) | — | 2.650 | — | 2.650 | — |
| NaOH/S (mol/mol) | — | 1.050 | — | 1.050 | — |
| Temp./time (° C./h) | — | 260/3.0 | — | 260/3.0 | — |
| Properties of polymer |  |  |  |  |  |
| Melt viscosity (Pa · s) | 125 | 113 | 225 | 126 | 32 |
| Reactivity with AS (times) | 2.8 | 2.9 | 2.2 | 2.8 | 3.0 |

(Note)
(1) Melt viscosity: Measured at a temperature of 310° C. and a shear rate of 1216 $sec^{-1}$.
(2) Reactivity with AS: Reactivity of the polymer (PAS) with γ-aminopropyltriethoxysilane (AS) and indicated by a ratio (times) between the melt viscosities after and before the reaction.

Comparative Example 1

1. Dehydration Step

A 20-liter autoclave (reactor) made of titanium was charged with 1,980.3 g of the same aqueous sodium hydrosulfide (NaSH) solution having an analytical value of 62.29% by weight as measured by iodimetry as that used in Example 1 and 1,115 g (NaOH content: 20.68 mol) of a 74.18% by weight aqueous sodium hydroxide (NaOH) solution together with 6,000 g of NMP. When the sulfur source composed of sodium hydrosulfide and sodium sulfide is indicated as "S", NaOH/NaSH before dehydration is 0.96 (mol/mol), and NaOH/S is 0.94 (mol/mol).

After the interior of the reactor was purged with nitrogen gas, the contents were gradually heated to 200° C. over 2 hours and 20 minutes with stirring to distill off 901.7 g of water and 776.9 g of NMP. At this time, 0.39 mol of hydrogen sulfide ($H_2S$) was volatilized off. Accordingly, the amount of the available S in the reactor after the dehydration step was 21.61 mol. The amount of $H_2S$ volatilized off corresponded to 1.78 mol % based on the sulfur source charged into the reactor.

2. Charging Step

After the dehydration step, the reactor containing 21.61 mol of the available S (charged sulfur source) was cooled down to 170° C., 3,241 g [pDCB/available S=1.020 (mol/mol)] of p-dichlorobenzene (pDCB), 2,881 g of NMP and 88 g [total water content in the reactor/available S=1.500 (mol/mol)] of water were added, and 2.7 g of NaOH having a purity of 97% was added in such a manner that (NaOH in the reactor/available S) is 1.000 (mol/mol). NaOH (0.78 mol) produced by volatilization of $H_2S$ is contained in the reactor.

3. Polymerization Step

While stirring the charging mixture at 250 rpm by a stirrer installed in the reactor, a reaction was conducted at 220° C. for 1 hour, and the reaction mixture was then heated to 230° C. over 30 minutes to conduct a reaction at 230° C. for 1.5 hours (first-stage polymerization step). The conversion of PDCB upon completion of the first-stage polymerization was 92%.

Thereafter, the number of revolutions of the stirrer was increased to 400 rpm, 440 g of water was charged under pressure into the reactor [total water content in the reactor/available S=2.630 (mol/mol)] while continuing the stirring, and the contents were heated to 260° C. to conduct a reaction for 4.0 hours (second-stage polymerization step).

4. Post Treatment Step

After completion of the reaction, the reaction mixture was cooled near to room temperature and then sifted through a 100-mesh screen to collect a granular polymer. The polymer separated washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 82%. The data of physical properties of the polymer are shown in Table 2.

Comparative Example 2

1. Dehydration Step

A 20-liter autoclave (reactor) made of titanium was charged with 1,980.3 g of the same aqueous sodium hydrosulfide (NaSH) solution having an analytical value of 62.29% by weight as measured by iodimetry as that used in Example 1 and 1,115 μg (NaOH content: 20.68 mol) of a 74.18% by weight aqueous sodium hydroxide (NaOH) solution together with 6,000 g of NMP. When the sulfur source composed of sodium hydrosulfide and sodium sulfide is indicated as "S", NaOH/NaSH before dehydration is 0.96 (mol/mol), and NaOH/S is 0.94 (mol/mol).

After the interior of the reactor was purged with nitrogen gas, the contents were gradually heated to 200° C. over 2 hours and 20 minutes with stirring to distill off 901.7 g of water and 776.9 g of NMP. At this time, 0.39 mol of hydrogen sulfide ($H_2S$) was volatilized off. Accordingly, the amount of the available S in the reactor after the dehydration step was 21.61 mol. The amount of $H_2S$ volatilized off corresponded to 1.78 mol % based on the sulfur source charged into the reactor.

2. Charging Step

After the dehydration step, the reactor containing 21.61 mol of the available S (charged sulfur source) was cooled down to 170° C., 3,241 g [pDCB/available S=1.020 (mol/mol)] of p-dichlorobenzene (pDCB), 2,881 g of NMP and 88 g [total water content in the reactor/available S=1.500 (mol/mol)] of water were added, and 2.7 g of NaOH having a purity of 97% was added in such a manner that (NaOH in the reactor/available S) is 1.000 (mol/mol). NaOH (0.78 mol) produced by volatilization of $H_2S$ is contained in the reactor.

3. Polymerization Step

While stirring the charging mixture at 250 rpm by a stirrer installed in the reactor, a reaction was conducted at 220° C. for 1 hour, and the reaction mixture was then heated to 230° C. over 30 minutes to conduct a reaction at 230° C. for 1.5 hours (first-stage polymerization step). The conversion of pDCB upon completion of the first-stage polymerization was 92%.

Thereafter, the number of revolutions of the stirrer was increased to 400 rpm, 44.6 g (NaOH content: 43.3 g) of NaOH having a purity of 97% was added [total NaOH content in the reactor/available S=1.050 (mol/mol)] while continuing the stirring, and the contents were heated to 260° C. to conduct a reaction for 4.0 hours (second-stage polymerization step).

4. Post Treatment Step

After completion of the reaction, the reaction mixture was cooled near to room temperature and then filtered to collect a granular polymer captured on filter paper. The polymer collected washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 93%. The data of physical properties of the polymer are shown in Table 2.

Comparative Example 3

1. Dehydration Step

A 20-liter autoclave (reactor) made of titanium was charged with 1,979.9 g of the same aqueous sodium hydrosulfide (NaSH) solution having an analytical value of 62.29% by weight as measured by iodimetry as that used in Example 1 and 1,170 g (NaOH content: 21.70 mol) of a 74.18% by weight aqueous sodium hydroxide (NaOH) solution together with 6,000 g of NMP. When the sulfur source composed of sodium hydrosulfide and sodium sulfide is indicated as "S", NaOH/NaSH before dehydration is 1.008 (mol/mol), and NaOH/S is 0.986 (mol/mol).

After the interior of the reactor was purged with nitrogen gas, the contents were gradually heated to 200° C. over 2 hours and 20 minutes with stirring to distill off 908.8 g of water and 873.6 g of NMP. At this time, 0.35 mol of hydrogen sulfide ($H_2S$) was volatilized off. Accordingly, the amount of the available S in the reactor after the dehydration step was 21.65 mol. The amount of $H_2S$ volatilized off corresponded to 1.61 mol % based on the sulfur source charged into the reactor.

2. Charging Step

After the dehydration step, the reactor containing 21.65 mol of the available S was cooled down to 170° C., 3,246 g

[pDCB/available S=1.020 (mol/mol)] of p-dichlorobenzene (pDCB), 2,991 g of NMP and 80 g [total water content in the reactor/available S=1.500 (mol/mol)] of water were added, and 53 g of NaOH having a purity of 97% was added in such a manner that (NaOH in the reactor/available S) is 1.100 (mol/mol). NaOH (0.70 mol) produced by volatilization of $H_2S$ is contained in the reactor.

3. Polymerization Step

While stirring the charging mixture at 250 rpm by a stirrer installed in the reactor, a reaction was conducted at 220° C. for 1 hour, and the reaction mixture was then heated to 230° C. over 30 minutes to conduct a reaction at 230° C. for 1.5 hours (first-stage polymerization step). The conversion of pDCB upon completion of the first-stage polymerization was 92%.

Thereafter, the number of revolutions of the stirrer was increased to 400 rpm, 441 g of water was charged under pressure into the reactor [total water content in the reactor/available S=2.630 (mol/mol)] while continuing the stirring, and the contents were heated to 260° C. to conduct a reaction for 4.0 hours (second-stage polymerization step).

4. Post Treatment Step

After completion of the reaction, the reaction mixture was cooled near to room temperature and then sifted through a 100-mesh screen to collect a granular polymer. The polymer separated washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 90%. The data of physical properties of the polymer are shown in Table 2.

Comparative Example 4

1. Dehydration Step

An aqueous sodium hydrosulfide (NaSH) solution having an analytical value of 62.87% by weight as measured by iodimetry was used as a sulfur source. This aqueous solution contains 22.32 mol of a sulfur source (S). The analytical value of NaSH by a neutralization titration method in this sulfur source is 61.48% by weight (21.83 mol), and 0.50 mol of sodium sulfide ($Na_2S$) is contained therein.

A 20-liter autoclave (reactor) made of titanium was charged with 1,990.4 g of the aqueous sodium hydrosulfide solution and 583.8 g (NaOH content: 10.90 mol) of a 74.69% by weight aqueous sodium hydroxide (NaOH) solution together with 6,702 g of NMP. When the sulfur source composed of sodium hydrosulfide and sodium sulfide is indicated as "S", NaOH/NaSH before dehydration is 0.499 (mol/mol), and NaOH/S is 0.488 (mol/mol).

After the interior of the reactor was purged with nitrogen gas, the contents were gradually heated to 200° C. over 2 hours with stirring to distill off 873.2 g of water and 1,306.9 g of NMP. At this time, 0.52 mol of hydrogen sulfide ($H_2S$) was volatilized off. Accordingly, the amount of the available S in the reactor after the dehydration step was 21.80 mol. The amount of $H_2S$ volatilized off corresponded to 2.33 mol % based on the sulfur source charged into the reactor.

2. Charging Step

After the dehydration step, the reactor containing 21.80 mol of the available S (charged sulfur source) was cooled down to 170° C., 3,269 g [pDCB/available S=1.020 (mol/mol)] of p-dichlorobenzene (pDCB), 2,781 g of NMP, 55 g [total water content in the reactor/available S=0.700 (mol/mol)] of water, and 48.2 g of NaOH having a purity of 97% were added in such a manner that (NaOH in the reactor/available S) is 0.600 (mol/mol). NaOH (1.04 mol) produced by volatilization of $H_2S$ is contained in the reactor.

3. Polymerization Step

While stirring the charging mixture at 250 rpm by a stirrer installed in the reactor, 545.7 g [total water content in the reactor/available S=1.450 (mol/mol); total NaOH/available S=1.070 (mol/mol)] of a 74.8% by weight aqueous NaOH solution was added at the time a reaction had been conducted at 220° C. for 30 minutes, and the reaction was additionally conducted at 220° C. for 30 minutes. Thereafter, the reaction mixture was heated to 230° C. over 30 minutes to conduct a reaction at 230° C. for 1.5 hours (first-stage polymerization step). The conversion of PDCB upon completion of the first-stage polymerization was 93%.

Thereafter, the number of revolutions of the stirrer was increased to 400 rpm, 464 g of water was charged under pressure into the reactor [total water content in the reactor/available S=2.630 (mol/mol)] while continuing the stirring, and the contents were heated to 260° C. to conduct a reaction for 4.0 hours (second-stage polymerization step).

4. Post Treatment Step

After completion of the reaction, the reaction mixture was cooled near to room temperature and then sifted through a 100-mesh screen to collect a granular polymer. The polymer separated washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 93%. The data of physical properties of the polymer are shown in Table 2.

Comparative Example 5

The process was conducted in the same manner as in Example 3 except that (NaOH in the reactor/available S) in the charging step was increased from 1.000 (mol/mol) to 1.100 (mol/mol), and NaOH was not added in the second-stage polymerization step. The yield of the granular polymer thus obtained was 79%. The data of physical properties of the polymer are shown in Table 2.

Comparative Example 6

The process was conducted in the same manner as in Comparative Example 1 except that the reaction time in the second-stage polymerization step in the polymerization step was shortened from 4.0 hours to 1.0 hour. The yield of the granular polymer thus obtained was 75%. The data of physical properties of the polymer are shown in Table 2.

TABLE 2

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| First-stage polymerization | | | | | | |
| pDCB/S (mol/mol) | 1.020 | 1.020 | 1.020 | 1.020 | 1.020 | 1.020 |
| $H_2O$/S (mol/mol) | 1.500 | 1.500 | 1.500 | 0.700 | 1.700 | 1.500 |
| NaOH/S (mol/mol) | 1.000 | 1.000 | 1.100 | 0.600 | 1.100 | 1.000 |
| Initial pH | 12.8 | 12.8 | 13.8 | 11.9 | 13.7 | 12.8 |
| Temp./time (° C./h) | 220/1.0 230/1.5 | 220/1.0 230/1.5 | 220/1.0 230/1.5 | 220/0.5 | 220/4.5 | 220/1.0 230/1.5 |
| After later addition of NaOH | | | | | | |
| $H_2O$/S (mol/mol) | — | — | — | 1.45 | — | — |
| NaOH/S (mol/mol) | — | — | — | 1.07 | — | — |
| Temp./time (° C./h) | — | — | — | 220/0.5 230/1.5 | — | — |
| Second-stage polymerization | | | | | | |
| $H_2O$/S (mol/mol) | 2.630 | 1.500 | 2.630 | 2.630 | 3.420 | 2.630 |
| NaOH/S (mol/mol) | 1.000 | 1.050 | 1.100 | 1.070 | 1.100 | 1.000 |
| Temp./time (° C./h) | 260/4.0 | 260/4.0 | 260/4.0 | 260/4.0 | 255/3.0 245/7.5 | 260/1.0 |
| After later addition of NaOH | | | | | | |
| $H_2O$/S (mol/mol) | — | — | — | — | — | — |
| NaOH/S (mol/mol) | — | — | — | — | — | — |
| Temp./time (° C./h) | — | — | — | — | — | — |
| Properties of polymer | | | | | | |
| Melt viscosity (Pa·s) | 30 | 20 | 80 | 110 | 139 | 8 |
| Reactivity with AS (times) | 2.7 | 2.4 | 1.8 | 1.4 | 1.6 | 2.9 |

(Note)
(1) Melt viscosity: Measured at a temperature of 310° C. and a shear rate of 1216 sec$^{-1}$.
(2) Reactivity with AS: Reactivity of the polymer (PAS) with γ-aminopropyltriethoxysilane (AS) and indicated by a ratio (times) between the melt viscosities after and before the reaction.

<Consideration>

The following facts are known from the experimental results shown in Table 1.

(1) According to the production process (Examples 1 to 5) of the present invention, PASs high in melt viscosity and high in the reactivity with a silane coupling agent, which is indicated by "reactivity with AS" can be efficiently provided. In the cases of Examples 1, 2 and 4, PASs having reactivity exceeding 2.5 in terms of the reactivity with AS are obtained though their melt viscosities are as high as at least 100 Pa·s. In Example 3, a PAS, whose reactivity with AS is on a high level as 2.2, is obtained though its melt viscosity was heightened to higher than 200 Pa·s.

In Example 5, a PAS (i.e., a highly reactive PAS) high in the reactivity with the silane coupling agent is obtained though the polymerization time in the second-stage polymerization step is greatly shortened to 1.0 hour from 4.0 hours compared with Example 1, and it is thus understood that high efficiency in the polymerization reaction can be achieved. When Example 5 is compared with Comparative Example 1, it is understood that the highly reactive PAS having an equivalent or higher melt viscosity can be efficiently produced in a short period of time according to the production process of the present invention.

Further, in Examples 1, 2 and 4, PASs having a melt viscosity of 113 to 126 Pa·s are obtained. The polymerization time in the second-stage polymerization step in each of these Examples is as short as 4.0 hours at 260° C. Even in the first-stage polymerization steps of these Examples, a short polymerization time is adopted.

On the other hand, in Examples 1 to 3 of the aforementioned International Publication No. 2004/060972 Pamphlet, the polymerization time in the second-stage polymerization step is preset to 5.0 hours at 260° C. in order to obtain a PAS having a melt viscosity of 110 to 145 Pa·s. The polymerization time in the first-stage polymerization step is also 1.5 to 3.0 hours.

As described above, according to the production process of the present invention, in which the alkali metal hydroxide is added in the second-stage polymerization step, in which the phase-separation polymerization is conducted, the polymerization time can be greatly shortened for producing a highly reactive PAS having a melt viscosity on the same level as a conventional PAS.

(2) On the other hand, as shown in Comparative Example 1, it was difficult to make the melt viscosity sufficiently high in the case where NaOH was not added in the second-stage polymerization step, in which the phase-separation polymerization is conducted even when the two-stage polymerization process was adopted. In other words, it was proved that it is difficult to stably provide a PAS having a high melt viscosity and high reactivity with the silane coupling agent.

(3) Even when NaOH is added after completion of the first-stage polymerization step, and the temperature is then raised to conduct a polymerization, a PAS having a high melt viscosity cannot be obtained when no phase separation agent is added (Comparative Example 2). In other words, it is understood that even when the alkali metal hydroxide is added, a PAS having a high melt viscosity cannot be obtained when the phase-separation polymerization process is not adopted in the second-stage polymerization step.

(4) Comparative Example 3 shows that when the amount of NaOH in the first-stage polymerization step is increased, and NaOH is not additionally added in the second-stage polymerization step, the reactivity with the silane coupling agent is lowered. It is understood that it is difficult to provide a PAS having a high melt viscosity and high reactivity with the silane coupling agent according to the polymerization reaction under such conditions.

(5) Comparative Example 4 is an experimental example where NaOH was additionally added in the first-stage polymerization step. However, the reactivity of the resultant PAS with the silane coupling agent is markedly lowered because the pH of the charging mixture upon the initiation of the polymerization reaction is low, and NaOH is not added in the second-stage polymerization step (phase-separation polymerization step).

(6) Comparative Example 5 is an experimental example where the process was conducted in the same manner as in Example 3 except that (NaOH in the reactor/available S) in the charging step was increased from 1.000 (mol/mol) to 1.100 (mol/mol), and NaOH was not added in the second-stage polymerization step. When Comparative Example 5 is compared with Example 3, the reactivity with AS is lowered from 2.2 (Example 3) to 1.6 in addition to the fact that the melt viscosity is greatly lowered from 225 Pa·s (Example 3) to 139 Pa·s. In other words, it is understood that it is difficult to stably provide a PAS having a high melt viscosity and high reactivity when the alkali metal hydroxide is not added in the second-stage polymerization step (phase-separation polymerization step).

(7) Comparative Example 6 is an experimental example where the reaction time in the second-stage polymerization step in Comparative Example 1 was shortened from 4.0 hours to 1.0 hour. It is understood that the melt viscosity is markedly lowered from 30 Pa·s in Comparative Example 1 to 8 Pa·s. On the other hand, in Example 5, a highly reactive PAS having a melt viscosity of 32 Pa·s is obtained though the reaction time in the second-stage polymerization step is 1.0 hour like Comparative Example 6. When Example 5 is compared with Comparative Example 1, it is thus understood that a highly reactive PAS having a melt viscosity on the same level as in Comparative Example 1 can be efficiently produced in a short period of time according to the production process of the present invention.

EFFECTS OF THE INVENTION

According to the production process of the present invention, a PAS having excellent reactivity with the silane coupling agent can be stably and efficiently produced. In other words, according to the production process of the present invention, a PAS having a melt viscosity on the same level as in the conventional process and high reactivity can be stably and efficiently produced in a short period of time compared with the conventional process (comparison of Example 5 with Comparative Examples 1 and 6).

According to the production process of the present invention, a PAS having good reactivity with the silane coupling agent and an optionally high melt viscosity can be produced. According to the production process of the present invention, a PAS improved in the reactivity with the silane coupling agent on at least the same level as in the prior art can also be obtained.

Since the PAS obtained by the production process according to the present invention is excellent in the reactivity with the silane coupling agent, the viscosity in the molten state is increased by adding the silane coupling agent, the occurrence of flash in melt molding is reduced, and moreover the toughness is increased. According to the production process of the present invention, side reactions and decomposition reactions can be inhibited, so that a high-quality PAS can be obtained.

INDUSTRIAL APPLICABILITY

According to the production process of the present invention, PASs high in melt viscosity and excellent in the reactivity with the silane coupling agent can be efficiently provided. The PASs obtained by the production process according to the present invention can be utilized in a wide variety of fields such as electrical and electronic equipments and automotive equipments because they can be molded or formed into various kinds of molded or formed products, films, sheets, fibers, etc. by general melt processing processes such as extrusion, injection molding and compression molding.

The invention claimed is:

1. A process for producing a poly(arylene sulfide) by polymerizing a sulfur source and a dihalo-aromatic compound in an organic amide solvent, the process comprising:
a dehydration step of heating a mixture containing the organic amide solvent, the sulfur source and an alkali metal hydroxide to discharge at least a part of a distillate containing water from an interior of a system containing the mixture to an exterior of the system;
a charging step of preparing a charging mixture containing the organic amide solvent, the sulfur source, the alkali metal hydroxide, water and the dihalo-aromatic compound and having a pH of 12.5-13.5 as measured by a pH meter;
a first-stage polymerization step in a uniformly dissolved state of a reaction mixture of heating the charging mixture to a temperature of 170 to 270° C. to initiate a polymerization reaction, thereby forming a prepolymer that a conversion of the dihalo-aromatic compound is at least 50%; and
a second-stage polymerization step in a phase-separated state of adding a phase separation agent into the reaction system containing the prepolymer and adding an alkali metal hydroxide in an amount corresponding to 1 to 10 mol % per mol of the sulfur source at a time or in portions, thereby continuing the polymerization reaction at a temperature of 240 to 290° C.

2. The production process according to claim 1, wherein the sulfur source is a sulfur source containing an alkali metal hydrosulfide.

3. The production process according to claim 2, wherein the sulfur source is a sulfur source containing more than 50 mol % of the alkali metal hydrosulfide and less than 50 mol % of an alkali metal sulfide.

4. The production process according to claim 1, wherein in the charging step, the dihalo-aromatic compound in a proportion of 0.950 to 1.200 mol per mol of the sulfur source is charged.

5. The production process according to claim 1, wherein in the charging step, a charging mixture containing the organic amide solvent, the sulfur source including the alkali metal hydrosulfide, the alkali metal hydroxide in a proportion of 0.980 to 1.030 mol per mol of the sulfur source, water in a proportion of 0.500 to 2.000 mol per mol of the sulfur source and the dihalo-aromatic compound and having a pH of 12.5-13.5 is prepared.

6. The production process according to claim 5, wherein in the charging step, a charging mixture containing a charged sulfur source including 70 to 99.5 mol % of the alkali metal hydrosulfide and 0.5 to 30 mol % of the alkali metal sulfide is prepared.

7. The production process according to claim 5, wherein in the charging step, a charging mixture containing water in a proportion of 1.000 to 1.800 mol per mol of the sulfur source is prepared.

8. The production process according to claim 5, wherein in the charging step, a charging mixture containing the dihalo-aromatic compound in a proportion of 0.950 to 1.200 mol per mol of the sulfur source is prepared.

9. The production process according to claim 5, wherein in the charging step, a charging mixture containing the dihalo-aromatic compound in a proportion of 1.000 to 1.090 mol per mol of the sulfur source is prepared.

10. The production process according to claim 1, wherein in the first-stage polymerization step, the charging mixture is heated to 200 to 260° C. to conduct a polymerization reaction.

11. The production process according to claim 1, wherein in the first-stage polymerization step, a prepolymer that a conversion of the dihalo-aromatic compound is 50 to 98% is formed.

12. The production process according to claim 1, wherein in the second-stage polymerization step, water is added as the phase separation agent.

13. The production process according to claim 12, wherein in the second-stage polymerization step, water is added as the phase separation agent in such a manner that the content of water in the reaction system is higher than 2.0 mol, but not higher than 10 mol per mol of the sulfur source.

14. The production process according to claim 1, wherein in the second-stage polymerization step, the alkali metal hydroxide is added in such a manner that the total amount of the alkali metal hydroxide is 1.010 to 1.100 mol per mol of the sulfur source.

15. The production process according to claim 1, wherein in the second-stage polymerization step, the polymerization reaction is continued in a state phase-separated into a concentrated polymer phase and a dilute polymer phase in the reaction system.

16. The production process according to claim 1, wherein upon the dehydration step, the sulfur source and the alkali metal hydroxide are supplied as respective aqueous mixtures.

17. The production process according to claim 1, wherein upon the dehydration step, the sulfur source including the alkali metal hydrosulfide is supplied.

18. The production process according to claim 1, which provides a poly(arylene sulfide) having a melt viscosity of 5 to 800 Pa·s as measured at a temperature of 310° C. and a shear rate of 1216 $sec^{-1}$.

19. The production process according to claim 1, which provides a poly(arylene sulfide) having a ratio MV2/MV1 of a melt viscosity MV2 of the poly(arylene sulfide) after a reaction with γ-aminopropyltriethoxysilane to a melt viscosity MV1 before the reaction exceeding 2.0 as measured at a temperature of 310° C. and a shear rate of 1,216 $sec^{-1}$.

20. The production process according to claim 1, wherein the polymerization reaction is conducted in the presence of at least one polymerization aid selected from the group consisting of metal salts of organic sulfonic acids, lithium halides, metal salts of organic carboxylic acids and alkali metal salts of phosphoric acid within a range of 0.01 to 10 mol per mol of the sulfur source.

21. The production process according to claim 1, wherein in the charging step, the alkali metal hydroxide in a proportion of 0.950 to 1.090 mol per mol of the sulfur source is charged.

* * * * *